(12) United States Patent
Noda et al.

(10) Patent No.: US 7,982,991 B2
(45) Date of Patent: Jul. 19, 2011

(54) METHOD AND APPARATUS FOR DETERMINING SET VALUE OF WRITE CURRENT OF MAGNETIC HEAD

(75) Inventors: Junzoh Noda, Kanagawa (JP);
Masahiro Shimizu, Kanagawa (JP);
Kouji Matsuda, Kanagawa (JP);
Hiroyasu Masuda, Kanagawa (JP);
Atsushi Tobari, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 736 days.

(21) Appl. No.: 11/807,044

(22) Filed: May 24, 2007

(65) Prior Publication Data

US 2007/0273993 A1 Nov. 29, 2007

(30) Foreign Application Priority Data

May 24, 2006 (JP) .................................. 2006-144373

(51) Int. Cl.
*G11B 5/09* (2006.01)

(52) U.S. Cl. ................ 360/46; 360/31; 360/59; 360/67; 360/68

(58) Field of Classification Search .................. None
See application file for complete search history.

(56) References Cited

U.S. PATENT DOCUMENTS

| | | | | |
|---|---|---|---|---|
| 5,600,500 A * | 2/1997 | Madsen et al. | .................. | 360/46 |
| 6,064,534 A * | 5/2000 | Simozato | ........................ | 360/46 |
| 6,075,664 A * | 6/2000 | Shimizu | .......................... | 360/46 |
| 6,078,455 A * | 6/2000 | Enarson et al. | ................ | 360/68 |
| 6,101,053 A * | 8/2000 | Takahashi | ....................... | 360/46 |
| 6,118,614 A * | 9/2000 | Lee | .................................. | 360/75 |
| 6,124,998 A * | 9/2000 | Kanegae | ........................ | 360/68 |
| 6,445,521 B1 * | 9/2002 | Schaff et al. | .................... | 360/31 |
| 6,914,738 B2 * | 7/2005 | Fujiwara et al. | ................ | 360/68 |
| 6,954,320 B2 * | 10/2005 | Yang | ................................ | 360/46 |
| 6,975,475 B2 * | 12/2005 | Lee et al. | ........................ | 360/68 |
| 7,095,576 B2 * | 8/2006 | Kim et al. | ........................ | 360/46 |
| 7,095,577 B1 * | 8/2006 | Codilian et al. | ................. | 360/46 |
| 7,102,838 B2 | 9/2006 | Kim et al. | | |
| 7,117,399 B2 * | 10/2006 | Song | .......................... | 714/704 |
| 7,126,778 B2 * | 10/2006 | Lamberts | ........................ | 360/69 |
| 7,212,361 B1 * | 5/2007 | Pederson et al. | ................ | 360/31 |
| 2005/0057835 A1 * | 3/2005 | Kim et al. | ....................... | 360/46 |

FOREIGN PATENT DOCUMENTS

| | | |
|---|---|---|
| JP | 06-231405 | 8/1994 |
| JP | 10-116401 | 5/1998 |
| JP | 10-334402 | 12/1998 |
| JP | 2000-030207 | 1/2000 |
| JP | 2000-222703 | 8/2000 |
| JP | 2001-143209 | 5/2001 |
| JP | 2002-367105 | 12/2002 |
| WO | WO 98/37548 | 8/1998 |

\* cited by examiner

*Primary Examiner* — Dismery E Mercedes
(74) *Attorney, Agent, or Firm* — Patterson & Sheridan, LLP

(57) ABSTRACT

Embodiments of the present invention help to efficiently determine the appropriate setting of the write current of a magnetic head relative to temperature. According to one embodiment, a test computer determines the set value of a write current as a function of temperature for each head device portion from the relationship between a write current and an error rate. A test execution controller sets a selected head device portion and a write current to an AE, and writes data on a magnetic disk using the components in a HDD. The test execution controller reads the written data, and the error rate of the data from an error correcting section. The test execution controller repeats the same process with the write current varied. Upon completion of the measurement at the preset write currents, the test execution controller transfers the measurement data to the test computer.

20 Claims, 9 Drawing Sheets

METHOD AND APPARATUS FOR DETERMINING SET VALUE OF WRITE CURRENT OF MAGNETIC HEAD

CROSS-REFERENCE TO RELATED APPLICATION

The instant nonprovisional patent application claims priority to Japanese Application No. 2006-144373 filed May 24, 2006 and incorporated by reference in its entirety herein for all purposes.

BACKGROUND OF THE INVENTION

Known disk drives include a disk drive that uses various media such as optical disks, magneto-optical disks, or flexible magnetic disks. Among them, hard disk drives (HDDs) have come into wide use as the storage device of computers, and have become a storage device that is indispensable for the present computer systems. The application of HDDs is becoming wider and wider because of their excellent features not only for computer systems but also for moving-picture recording and reproducing apparatuses, car navigation systems, and as removable memories for use in digital cameras.

HDDs are equipped with a magnetic disk on which data is stored and a head slider for accessing the magnetic disk. The head slider includes a head device for reading and/or writing data from/to the magnetic disk and a slider on which the head device is provided. HDDs further include an actuator for moving the head slider to a desired position on the magnetic disk. The actuator is driven by a voice coil motor (VCM) to rotate about the rotation axis, thereby moving the head slider in the radial direction on the rotating magnetic disk. Thus, the head device section gets access to a desired track on the magnetic disk, and reads/writes the data.

General HDDs change the write current of the head device portions with temperature. The holding power of magnetic disks decreases as temperature increases. The amount of projection of the head device portion to a magnetic disk increases with an increase in temperature, and thus, the distance between the head device portion and the magnetic disk decreases with an increase in temperature. Therefore, write current is generally set so as to decrease with an increase in temperature.

Write currents relative to temperatures are determined in consideration of short writing due to current shortage, adjacent track interference (ATI) and so on. In other words, write currents are set so as to allow necessary writing (magnetization transition) on a target data track and not to erase data written in adjacent data tracks.

Furthermore, write currents are optimized for each head device portion so as to absorb variations in the performance of the head device portions (for example, refer to Japanese Patent Publication No. 10-334402 ("Patent Document 1"). Specifically, head device portions actually write data at different temperatures, and the written data is read by the head device portions. Accordingly, writing characteristics such as an overwrite characteristic and an error rate are measured at different temperatures. Thus, a write current at which an optimum overwrite characteristic and the error rate are provided at each temperature, is determined in consideration of the head disk contact and ATI.

To make a correct determination of the write current relative to temperature for each head device portion, it is preferable to measure the writing characteristics of each head device portion at different temperatures in an HDD operating temperature range. However, it needs much time and many facilities for measuring writing characteristics at different temperatures in the process of manufacturing HDDs.

On the other hand, another method can be provided in which one temperature is selected from a plurality of temperature ranges such as a low temperature range, a normal temperature range, and a high temperature range; writing characteristics are measured at the selected temperature; and the optimum write current at the selected temperature is used at another temperature in the corresponding temperature range. However, it is difficult for this method to set a write current for each temperature. Accordingly, an efficient and appropriate method for determining write current settings relative to temperatures for each head device portion is required.

BRIEF SUMMARY OF THE INVENTION

Embodiments in accordance with the present invention efficiently determine the appropriate setting of the write current of a magnetic head relative to temperature. According to the particular embodiments shown in FIGS. 1 and 4, a test computer 51 determines the set value of a write current as a function of temperature for each head device portion 12 from the relationship between a write current and an error rate. A test execution controller 231 sets a selected head device portion 12 and a write current to an AE 13, and writes data on a magnetic disk 11 using the components in a HDD 1. The test execution controller 231 reads the written data, and the error rate of the data from an error correcting section 232. The test execution controller 231 repeats the same process with the write current varied. Upon completion of the measurement at the preset write currents, the test execution controller 231 transfers the measurement data to the test computer 51.

DETAILED DESCRIPTION OF THE INVENTION

Figure 1:
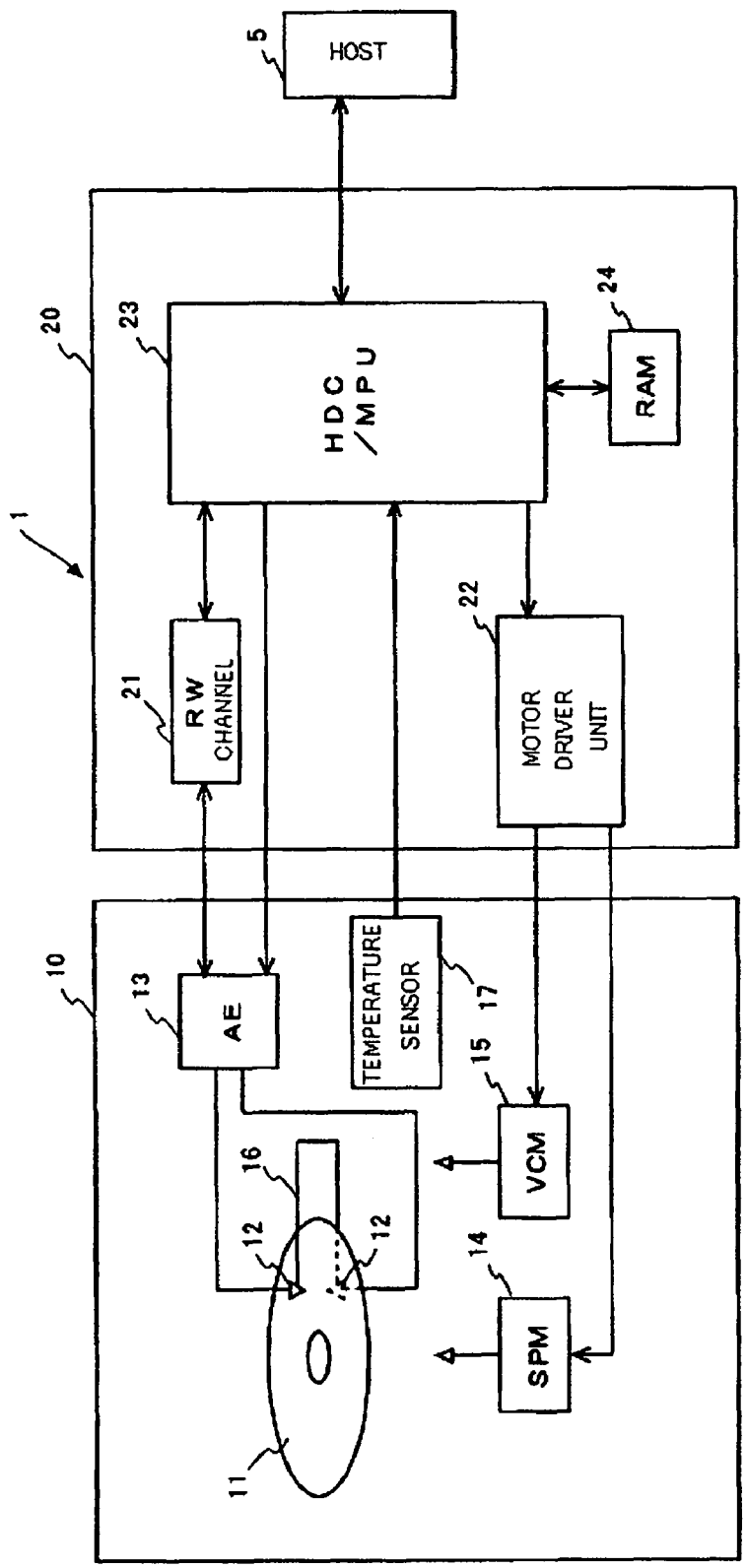
FIG. 1 is a schematic block diagram showing the overall structure of an HDD according to an embodiment of the invention.

Embodiments in accordance with the present invention relate to a method and an apparatus for determining the write current of a magnetic head, and in particular, to a method for determining the set value of the write current that varies with temperature.

According to an aspect of the invention, there is provided a method for determining the setting of the write current of a magnetic head, the current varying with temperature. The method comprises: measuring a writing characteristic value of the magnetic head to a magnetic disk at a plurality of different write currents; specifying the extent of the change in writing characteristic value relative to the write currents in a specified write current range; and determining the setting of a write current in a specified temperature range according to the extent of the change in writing characteristic value. This allows efficient and appropriate determination of a write current relative to temperature. The determination of the setting of the write current includes determination of an actual setting and a function that specifies the actual setting.

The writing characteristic value may be an error rate or a VGA gain. This facilitates determination of a write current more appropriately. In the determination of the setting of the write current, the extent of the change in a function indicative of the write current in the specified temperature range may be determined according to the extent of the change in the writing characteristic value. This facilitates determination of a write current.

The specified write current range may include at least part of a write current range corresponding to the specified temperature range. This allows more appropriate determination of the extent of the change of the write current.

In an example, the extent of the change in writing characteristic value corresponds to the inclination of the approximate line of the plurality of measured writing characteristic values. This facilitates more appropriate determination of the extent of the change of the writing characteristic value.

In an example, a write current at a reference temperature is first determined. In the determination of the setting of the write current, the extent of the change in a function indicative of a write current at temperatures higher than the reference temperature is determined according to the extent of the change in writing characteristic value. This facilitates appropriate setting of a write current in the higher temperature range which tends to cause trouble.

In an example, the setting of the write current decreases with an increase in temperature. The extent of the change of a plurality of measurements of the writing characteristic value is specified in the range lower than the write current at a reference temperature. The extent of the change in a function indicative of a write current at temperatures higher than the reference temperature is determined according to the extent of the change in the plurality of measurements. The extent of the change in the function indicative of the write current is determined so as to decrease with an increase in the extent of the change in the plurality of measurements. This facilitates appropriate setting of a write current in the higher temperature range, which tends to cause trouble because of its low current.

According to another aspect of embodiments in accordance with the present invention, there is provided an apparatus that determines the setting of the write current of a magnetic head, the current varying with temperature. The apparatus comprises a magnetic head that writes data on a magnetic disk at a plurality of different write currents and reads the written data; a circuit that measures the writing characteristic value of the head on the data read by the head; and a controller that determines the setting of a write current in a specified temperature range according to the extent of the change of the writing characteristic value relative to the write current in a specified write current range. This facilitates appropriate determination of a write current relative to temperature.

In an example, the controller specifies the extent of the change of the approximate line of the plurality of measured writing characteristic values in the range lower than a. reference write current. The controller determines the extent of the change of a linear function indicative of the setting of the write current in the higher temperature range corresponding to the reference write current according to the extent of the change of the approximate line so as to decrease with an increase in the extent of the change of the approximate line. This facilitates appropriate setting of a write current in the higher temperature range which tends to cause trouble.

According to another aspect of embodiments in accordance with the present invention, there is provided a method for determining the setting of the write current of a magnetic head, the current varying with temperature. The method comprises: measuring a writing characteristic value of the magnetic head to the magnetic disk at a plurality of different write currents; determining a write current at a reference temperature; and determining the extent of the change of a function indicative of write currents at temperatures higher and/or lower than the reference temperature according to the relationship between the measured writing characteristic value and the write current. This allows efficient and appropriate determination of the write current of a magnetic head relative to temperature. Preferably, the function indicative of the write current is a linear function that decreases with an increase in temperature; and the extent of the change of the function is determined according to the extent of the change of the measured writing characteristic value relative to the write current. This facilitates appropriate determination of the write current of a magnetic head relative to temperature.

According to an embodiment of the present invention, the write current of a magnetic head relative to temperatures can be set efficiently and appropriately.

An embodiment of the present invention will be described hereinbelow. For the purpose of clear description, the following description and drawings have omission and simplification as appropriate. In the drawings, the same components have the same numerals, and for the purpose of clear description, duplicate descriptions are omitted as necessary. Here, an embodiment of the invention will be described with a hard disk drive (HDD) as an example of a disk drive. In this embodiment, a write current and a writing characteristic value corresponding thereto are measured at a fixed temperature. The relationship between temperature and the write current is determined from the relationship between the write current and the writing characteristic. This allows efficient determination of a write current suitable for the environmental temperature during operation.

For easy understanding of the features of the embodiment, the overall structure of the HDD will be described first. FIG. 1 is a schematic block diagram of the overall structure of an HDD 1 according to the embodiment. As shown in FIG. 1, the HDD 1 includes, in an enclosure 10, a magnetic disk 11 which is an example of a disk on which data is stored, a head device portion 12, an arm electronics (AE) 13, a spindle motor (SPM) 14, a voice coil motor (VCM) 15, an actuator 16, and a temperature sensor 17 such as a thermistor. They are referred to as a head disk assembly (HDA).

The HDD 1 includes a circuit board 20 fixed to the outside of the enclosure 10. The circuit board 20 includes ICs thereon, such as a read write channel (RW channel) 21, a motor driver unit 22, a hard disk controller (HDC) and MPU integrated circuit (hereinafter, referred to as an HDC/MPU) 23, and a RAM 24. The circuit components can be integrated to one IC or divided in two or more ICs.

The SPM 14 rotates the magnetic disk 11 fixed thereto at a predetermined angular speed. The motor driver unit 22 drives the SPM 14 according to the control data from the HDC/MPU 23. The magnetic disk 11 of the embodiment has data recording surfaces on both sides. The head device portions 12 are provided in correspondence with the recording surfaces.

The head device portion 12 as an example of a head, is fixed to a slider (not shown). An assembly of the head device portion 12 and the slider is referred to as a head slider. The head slider is fixed to the actuator 16. In reading or writing data, the head slider levitates on the rotating magnetic disk 11. The actuator 16 is connected to the VCM 15, and rotates about the rotation axis to move the head device portions 12 (and the sliders) in the radial direction on the magnetic disk 11.

The motor driver unit 22 drives the VCM 15 according to the control data from the HDC/MPU 23. The head device portions 12 typically include a write element that converts an electric signal to a magnetic field according to write data and a read element that converts a magnetic field from the magnetic disk 11 to an electric signal. There should just be one or more magnetic disks 11. The recording surface of the magnetic disk 11 may be provided on one or both sides thereof.

The AE 13 selects one of the head device portions 12 which makes access to a corresponding recording surface among a plurality of head device portion 12, amplifies (preamplifies) the signal reproduced by the selected head device portion 12 with a fixed gain, and sends it to the RW channel 21. The AE 13 sends the recording signal from the RW channel 21 to the selected head device portion 12. The AE 13 has a register (not shown), and operates according to data set in the register. The HDC/MPU 23 sets data indicative of a head device portion 12 to be selected, a lead bias, or a write current to the register of the AE 13.

In the writing process, the RW channel 21 modulates the code of the write data supplied from the HDC/MPU 23, converts the modulated write data to a write signal, and supplies it to the AE 13. In the reading process, the RW channel 21 modulates the amplitude of the read signal supplied from the AE 13 to a predetermined value, extracts data from the obtained read signal, and decodes it. The read data includes user data and servo data. The decoded read data is supplied to the HDC/MPU 23.

In the HDC/MPU 23, the MPU operates according to the microcode loaded on the RAM 24. As the HDD 1 is activated, the RAM 24 is loaded with the microcode that operates on the MPU and data necessary for control and data processing from the magnetic disk 11 or a ROM (not shown).

The HDC is configured as a logic circuit, and executes various processes in connection with the MPU. For example, the HDC/MPU 23 performs processes necessary for data processing including management of the order of execution of commands, control of the positioning of the head device portions 12, control of the interface, and management of defects and also the overall control for the HDD 1. The HDC/MPU 23 of this embodiment sets a write current to the AE 13 according to the temperature measured by the temperature sensor 17. This will be described later.

The HDC/MPU 23 transfers the read data from the magnetic disk 11 which is obtained from the RW channel 21 to a host 51. The read data from the magnetic disk 11 is temporarily stored in the read buffer in the RAM 24, and then transferred to the host 51 via the HDC/MPU 23. The write data from the host 51 is temporarily stored in the write buffer in the RAM 24 via the HDC/MPU 23, and then transferred to the magnetic disk 11 via the HDC/MPU 23 at a predetermined timing.

Figure 2:
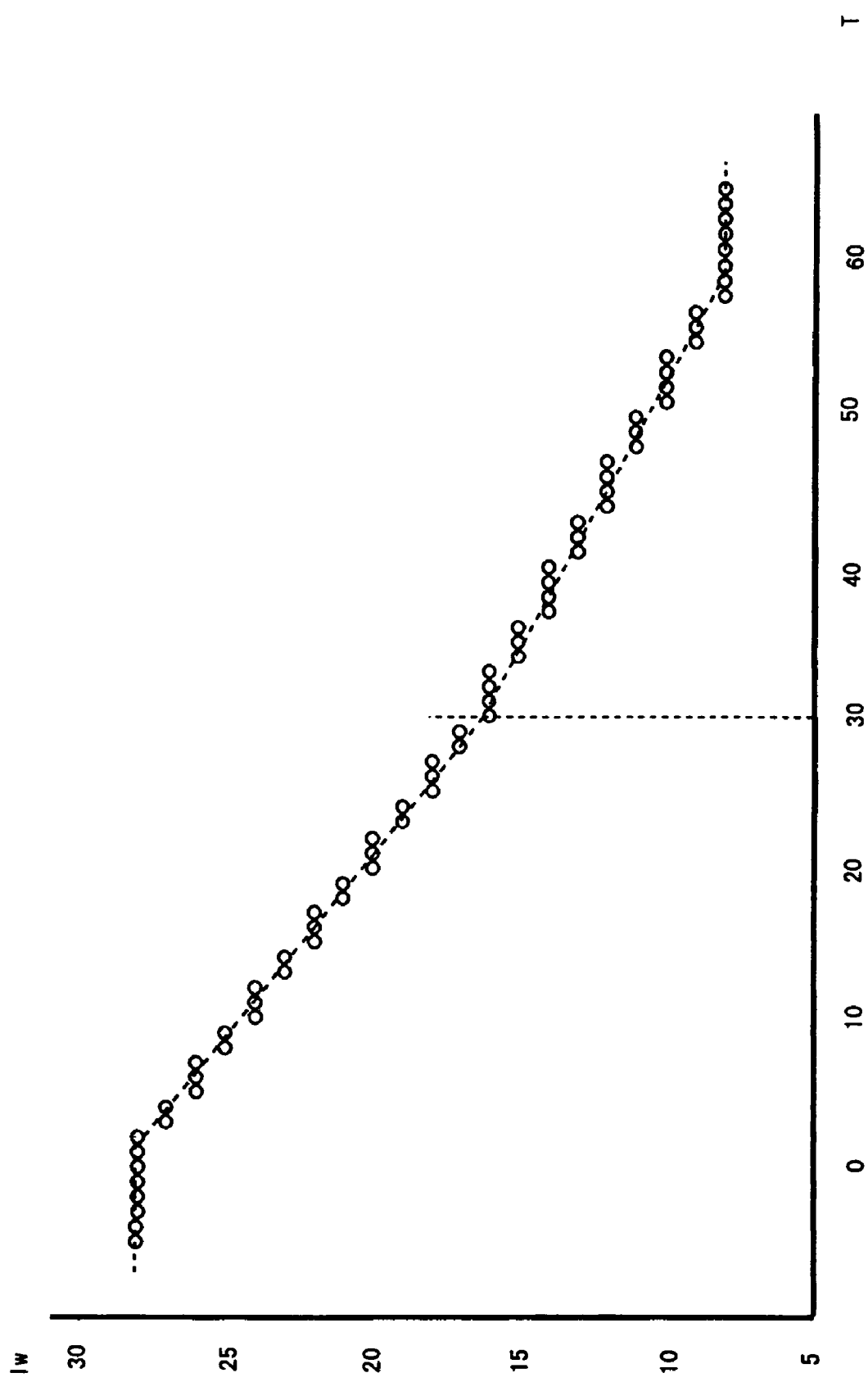
FIG. 2 is a graph of the relationship between temperatures and write currents of the HDD according to an embodiment of the invention.

As described above, the HDC/MPU 23 sets the data indicative of the head device portion 12 that accesses the recording surface and the data indicative of the write current to the AE 13 for writing operation. At that time, the HDC/MPU 23 acquires the temperature measured by the temperature sensor 17 and sets a write current corresponding to the temperature to the AE 13. FIG. 2 is a graph showing preferred examples of the relationship between the temperature measured by the temperature sensor 17 and the write current. The HDC/MPU 23 sets the write current expressed by the white circle in FIG. 2, to the AE 13 according to each temperature.

The X axis of the graph of FIG. 2 indicates the temperature and the Y axis indicates the levels of the write currents set to the AE 13 which are different from an actual current. The level of each write current is an integer, which varies every 1° C. Since the set level indicates the set value of the write current, it will be described hereinbelow as a write current.

In FIG. 2, the write current decreases monotonously with an increase in temperature. Since the set currents are discrete as described above, the same write current is set for a specified temperature width (temperature range). The guaranteed operating range of the HDD of this embodiment is from 0° C. to 60° C. For the temperature range of 0° C. or less, the same write current is set, and also for the temperature range of 60° C. or more, the same write current is set.

The graph of FIG. 2 shows different settings between the lower temperature range and the higher temperature range with 30° C. as a reference temperature (Tref). Specifically, as shown in FIG. 3(a), write currents are expressed as a linear function with an inclination a relative to temperature in the lower temperature range with respect to the reference temperature Tref. On the other hand, write currents in the higher temperature range with respect to the reference temperature Tref are expressed as a linear function with an inclination β relative to temperature. Since the write current is set as the level of an integer every 1° C., as described above, the actual write current takes a value approximated by the function. Typically, an integer that is obtained by rounding off the function at each temperature takes a set write current (the level of the write current set to the AE 13).

As shown in FIG. 3(b), the HDC/MPU 23 has, as preset values, a write current Iw_Tref at the reference temperature Tref (30° C. in the example of FIG. 2), the inclination α of the functions in the lower temperature range, and the inclination β of the functions in the higher temperature range. The HDC/MPU 23 calculates a write current from the set values according to the temperature measured by the temperature sensor 17. The HDC/MPU 23 then sets the data indicative of the write current (set level) to the AE 13.

A method for determining a temperature-write current set value will be described. In the method of this embodiment, a write current relative to temperature is determined from the relationship between the write current and a writing characteristic. In the preferred embodiment, a write current level (Iw_Tref) at the reference temperature Tref, an inclination a relative to temperature in the lower temperature range, and an inclination β relative to temperature in the higher temperature range are determined. This allows efficient and appropriate determination of a write current at each temperature without measurement of different many temperatures.

The write currents for the head device portions 12 are determined in the process of manufacturing the HDD 1. In the process of manufacturing the HDD 1, the components are mounted in the enclosure 10 to manufacture the HDA. Specifically, a head stack assembly (HSA) which is an assembly of the head slider and the actuator 16, the SPM 14, magnets of the VCM 15, and the magnetic disk 11 are mounted. The AE 13 is fixed to the actuator 16 in the process of manufacturing the HSA. After that, the circuit board 20 is mounted on the back of the enclosure 10 of the HDA to manufacture the HDD 1. The components in the HDA and the circuit board 20 are connected by a flexible cable extending from the enclosure 10.

Figure 4:
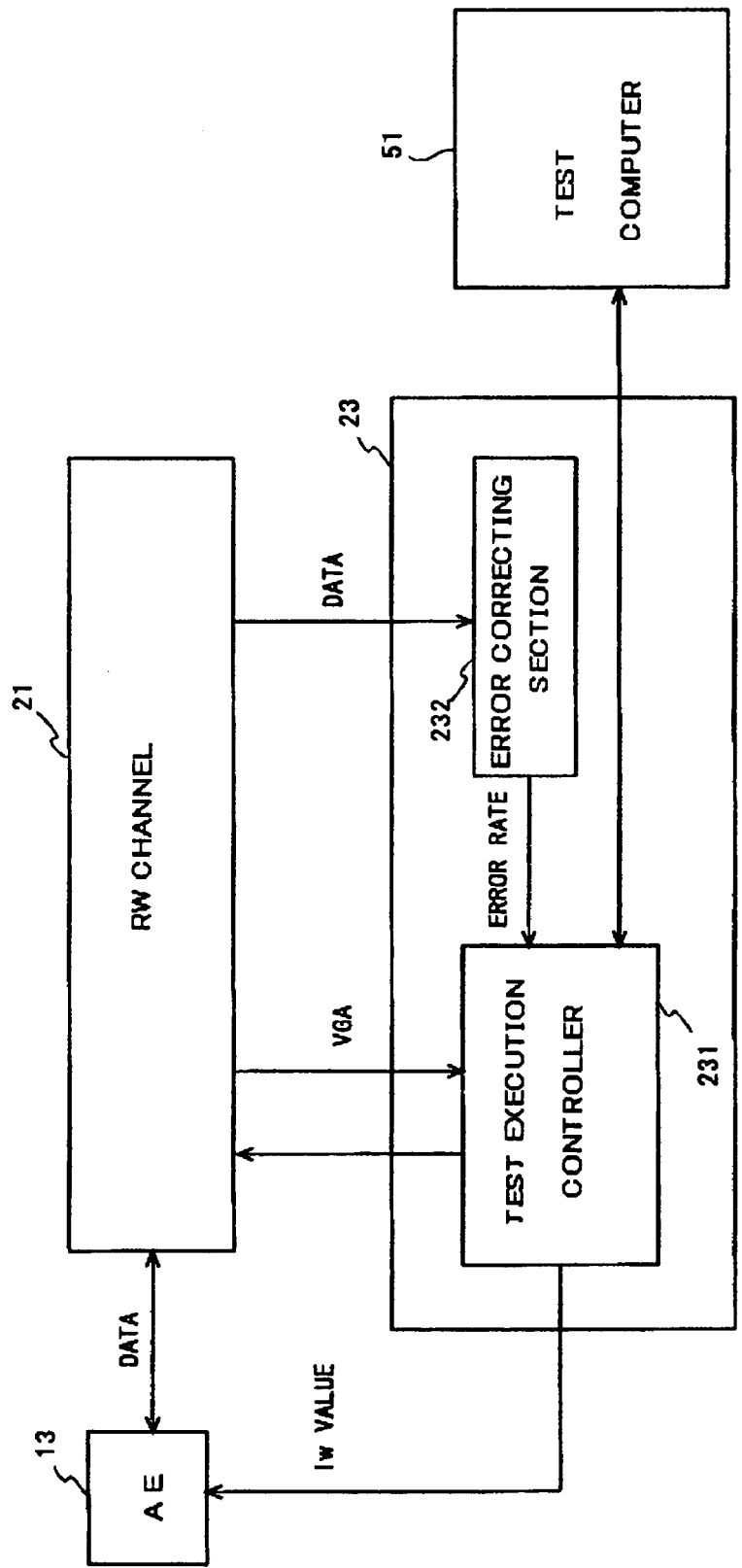
FIG. 4 is a schematic block diagram of the components related to the process of determining a write current relative to a measured temperature from the relationship between the write current and its writing characteristic according to an embodiment of the invention.

As shown in FIG. 4, the assembled HDD 1 is connected to a dedicated tester (test computer 51), where parameters are set and adjusted, and the performance is tested before shipment. In the setting and adjustment of the parameters, the test computer 51 registers parameters that determine write currents for the temperatures to the HDD 1. The HDD 1 that has passed the performance test is shipped as a product.

This will be described specifically. As shown in the block diagram of FIG. 4, the test computer 51 sends an instruction to a test execution controller 231 which is a function in the HDD 1, and the test execution controller 231 makes a measurement according to the instruction. The measurement is performed substantially at a fixed temperature. Specifically, the test execution controller 231 measures writing characteristic values for a plurality of different write currents. The test execution controller 231 then transfers the measurement data to the test computer 51. Part of the functions of the MPU and the HDC which operate according to a microcode functions as the test execution controller 231.

The test computer 51 is an example of a controller that determines a write current which is the function of temperature on the basis of the measurement data acquired. In the foregoing example, the test computer 51 determines a write current (Iw_Tref) at the reference temperature Tref, the inclination α of the linear function in the lower temperature range, and the inclination β of the linear function in the higher temperature range. This leads to a determination of the write current of the head device portion 12 relative to temperature. The test computer 51 transfers the determined parameters to the test execution controller 231. The test execution controller 231 stores the acquired parameters into the management area of the magnetic disk 11. After shipment, the HDC/MPU 23 determines a write current (write current set level) according to sensed temperature using the stored parameters.

In a preferred embodiment, the test computer 51 determines the relationship between temperature and the write current from the relationship between a write current and an error rate. The HDD 1 writes data at different write currents with the head device portion 12, and reads the written data. The HDD 1 further measures the error rate of the read data. The measurement of the error rate is performed at a fixed temperature, e.g., the reference temperature Tref. The error rate corresponding to each write current is transferred to the test computer 51. The test computer 51 determines the relationship between temperature and the write current set value from the relationship.

Another preferred embodiment of the writing characteristic to be measured is the gain of the variable gain amplifier (VGA) of the RW channel 21. The RW channel 21 adjusts the gain of the VGA by auto gain control (AGC) to keep the input signal from the AE 13 at a fixed level. In other words, the reading amplitude of the read element and the VGA gain are in inverse proportion. The test execution controller 231 can easily acquire the VGA gain by accessing the register of the RW channel 21. The test computer 51 can specify an appropriate relationship between temperature and the write current also from the relationship between the VGA and the write current. It is also possible that a circuit other than the RW channel 21 has the VGA, and its gain is used.

A method for determining a write current set value as the function of temperature for each head device portion 12 from the relationship between a write current and an error rate will now be described. As shown in FIG. 4, the test execution controller 231 acquires an error rate from the test execution controller 231, and transfers it to the test computer 51. An error correcting section 232 corrects the error using an error correction code (ECC) contained in the read data transferred from the RW channel 21, and transfers an error rate at that time to the test execution controller 231.

Upon instruction from the test computer 51, the test execution controller 231 measures the error rates of a plurality of preset write currents. Specifically, the test execution controller 231 sets a selected head device portion 12 and a write current to the AE 13, and writes data to the magnetic disk 11 using the components in the HDD 1. Furthermore, the test execution controller 231 reads the written data, and acquires the error rate of the data from the error correcting section 232.

The test execution controller 231 repeats the same operation with the write current changed. Upon completion of the measurement at the preset write currents, the test execution controller 231 transfers the measurement data to the test computer 51. The test execution controller 231 also executes the same operation on the head device portions 12. The functions of the test computer 51 and the test execution controller 231 can be designed as appropriate. For example, the test execution controller 231 may function as a controller for determining the relationship between temperature and the write current.

Figure 3:
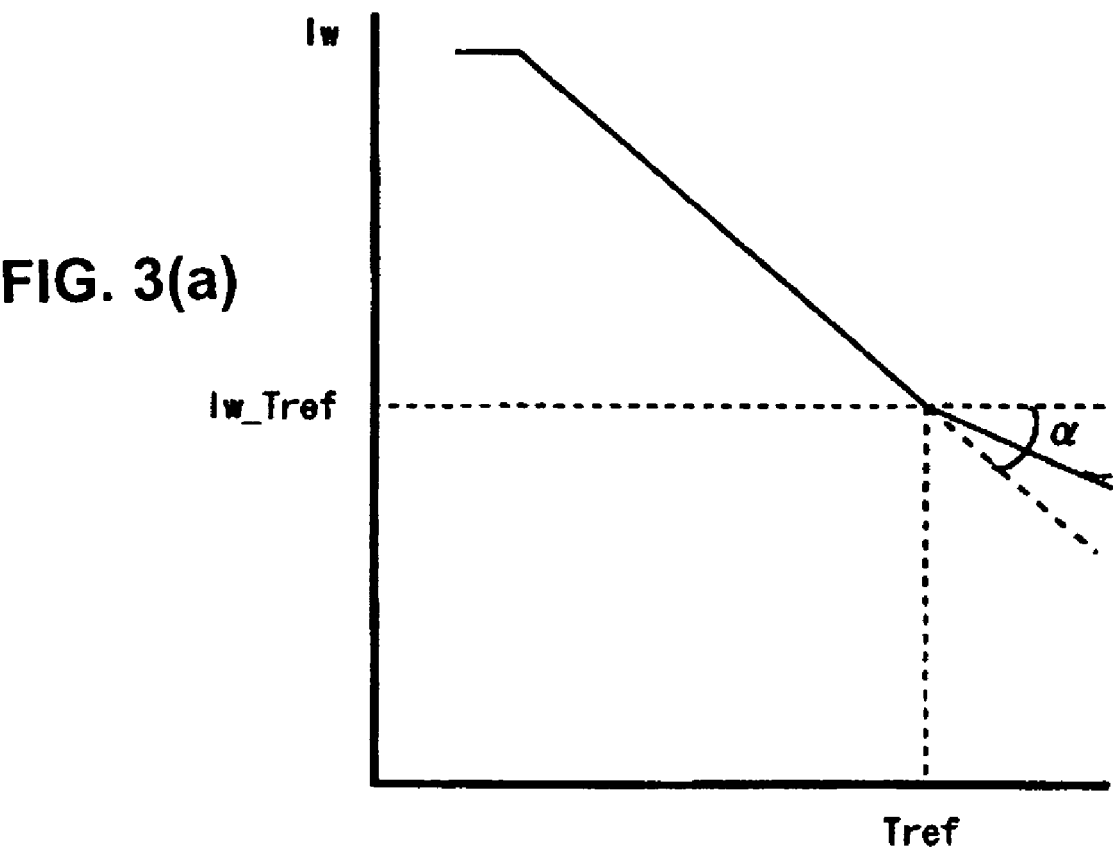
FIGS. 3(a) and 3(b) show a function and parameters for determining a write current from a measured temperature in the HDD according to an embodiment of the invention.
Figure 5A:
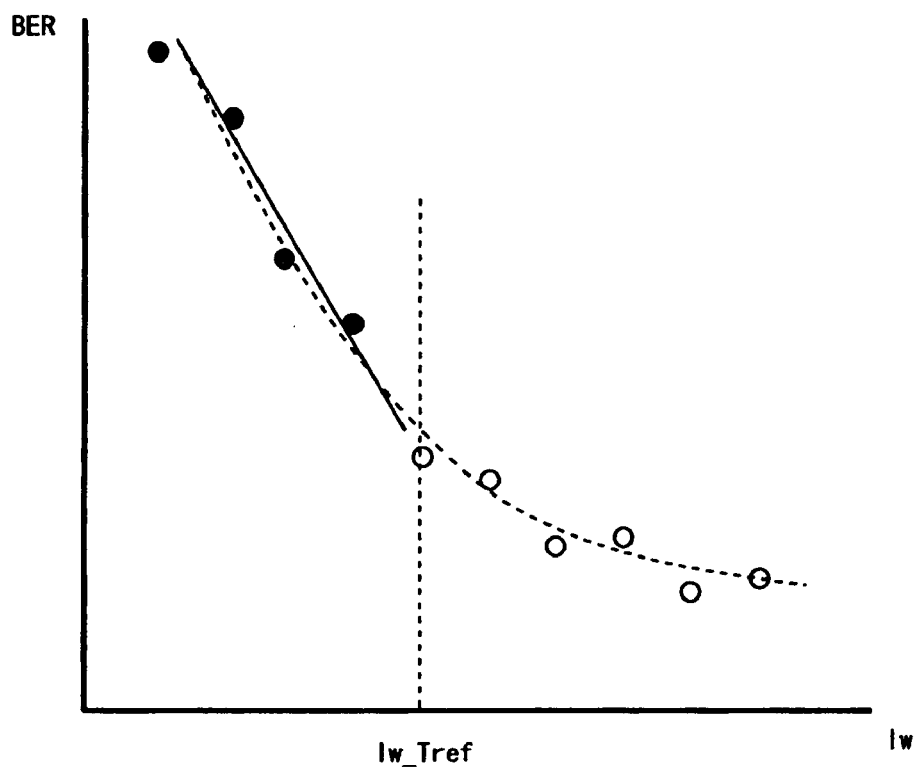
FIGS. 5(a) and 5(b) show examples of the relationship between write currents and measured error rates, according to an embodiment of the invention.
Figure 5B:
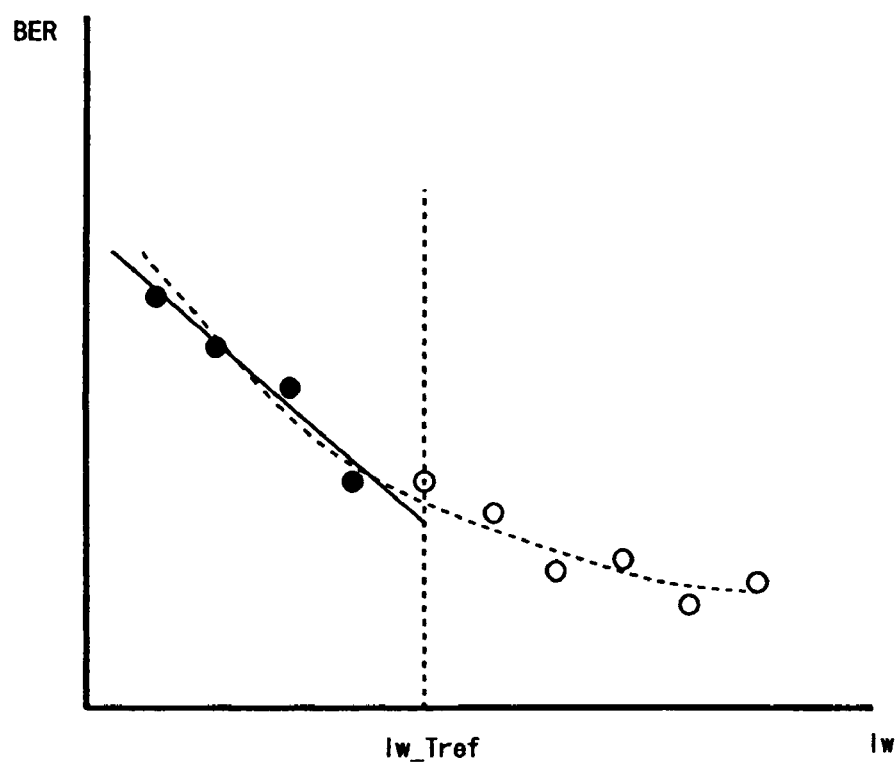

FIGS. 5(a) and 5(b) each show an example of the relationship between the write current and the error rate for a head device portion 12. An example of the error rate is a bit error rate (BER). The X axis indicates write currents, specifically, write current levels set to the AE 13, as shown in FIGS. 2 and 3. The Y axis indicates a bit error rate (BER). The circles indicate actual measurements, while the dotted curve is an approximate function curve of the measurements.

Here, the process of determining the inclination β at higher temperatures with respect to the reference temperature Tref in the example of FIG. 3 will be described. That is, the write current Iw_Tref at the reference temperature Tref and the inclination α in the lower temperature range are set to the same value preset for the head device portions 12. That is, the test computer 51 determines the preset write current Iw_Tref and the slope α in the lower temperature range as the parameters of the heads, and determines β from the measurement data. The write current Iw_Tref and the inclination α are determined at the designing of the HDD 1. Typically, the absolute value of the inclination in the higher temperature range is smaller than that in the lower temperature range.

Problems due to inappropriate write currents are prone to occur in the higher temperature range. This is because lower write currents are used in the higher temperature range, causing a significant effect of the variations of the head device portions. Specifically, if one default value is set, a head device portion cannot write to a magnetic disk at a necessary and sufficient level in the higher temperature range, that is, sufficient SER cannot often be obtained. Accordingly, it is important to optimize the write current set value for each head device portion.

The test computer 51 determines the inclination β according to the extent of the change in the BER relative to the write current. Specifically speaking, it is preferable that the test computer 51 specify the extent of the change in the BER in a write current range corresponding to the higher-temperature write current range. Accordingly, it is preferable that the write current range that specifies the extent of the change in BER include at least part of the write current range corresponding to the higher-temperature write current range. Thus, the test computer 51 specifies the extent of the change in the BER relative to the write current using a measurement lower than the reference write current Iw_Tref at the reference temperature Tref. This is because the write current in the higher temperature range is lower than the reference write current Iw_Tref. Here not all the measurements may be used.

In the examples of FIGS. 5(a) and (b), the test computer 51 calculates the extent of the change of the BER from four measurements less than the reference write current Iw_Tref. Specifically, the test computer 51 calculates the approximate line of four measurements by the method of least squares, and then calculates the inclination of the line. The four write currents may either contain a value smaller than an actually set write current or not. The test computer 51 may also determine the approximate line by a method other than the method of least squares.

In this embodiment, the test computer 51 uses the inclination of the line as the extent of the change in the BER relative to the write current. The inclination of the BER in the example of FIG. 5(a) is larger than that in FIG. 5(b). The test computer 51 determines the inclination β of the write current function in the higher temperature range according to the inclination of the BER.

Figure 6:
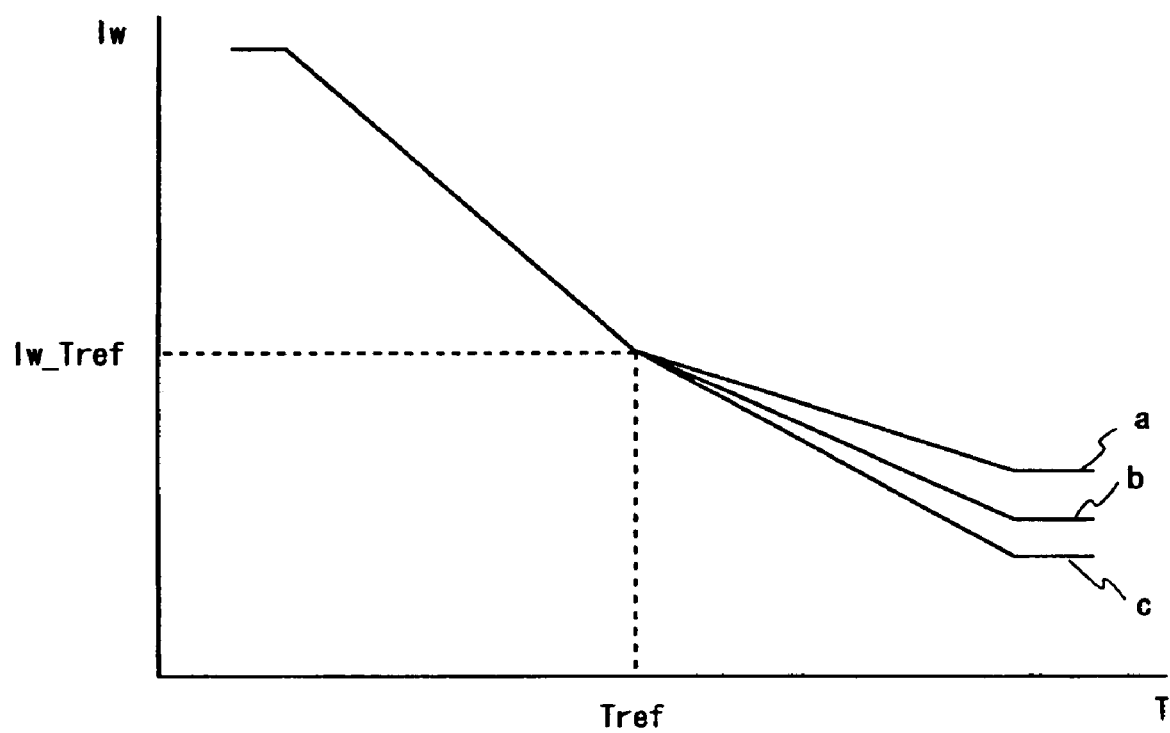
FIG. 6 shows a graph that specifies a write current relative to a measured temperature according to an embodiment of the invention.

FIG. 6 shows three graphs having different inclinations β in the higher temperature range. The write currents in the lower temperature range lower than the reference temperature Tref are equal on the graphs. The test computer 51 sets an inclination β whose absolute value is small to a head device portion 12 having a large absolute value of the inclination of the BER. In other words, the test computer 51 sets an inclination β that changes gradually to a head device portion 12 whose BER changes greatly relative to the write current. In contrast, the test computer 51 sets an inclination β whose absolute value is large to a head device portion 12 having a small absolute value of the inclination of the BER. In other words, the test computer 51 sets an inclination β that changes greatly to a head device portion 12 whose BER changes gradually.

For example, as shown by the graph of FIG. 5(a), a head device portion 12 whose BER changes greatly writes at a write current following the graph a with a smallest inclination in FIG. 6. As shown in FIG. 5(b), a head device portion 12 whose BER changes gradually writes at a write current following the graph c with a smallest inclination in FIG. 6.

The large inclination of the BER (the absolute value of the inclination) indicates that the BER increases (worsens) greatly with a decrease in write current. Accordingly, worsening in BER due to an increase in temperature is prevented by decreasing a decrease (the extent of change) in the write current with an increase in temperature. On the other hand, the small inclination of the BER indicates that an increase (worsening) in BER due to a decrease in write current is small. Accordingly, adjacent track interference (ATI) at high temperatures is decreased by increasing a decrease (the extent of change) in the write current with an increase in temperature.

The inclination of the write current may be changed continuously with the inclination of the BER. Alternatively, several values may be preset for the inclination of the write current, from which the inclination of the write current may be selected along the inclination of the BER. The set values on the inclination of the write current can be associated with different BER ranges of a specified width. This also applies to the following description.

Figure 7:
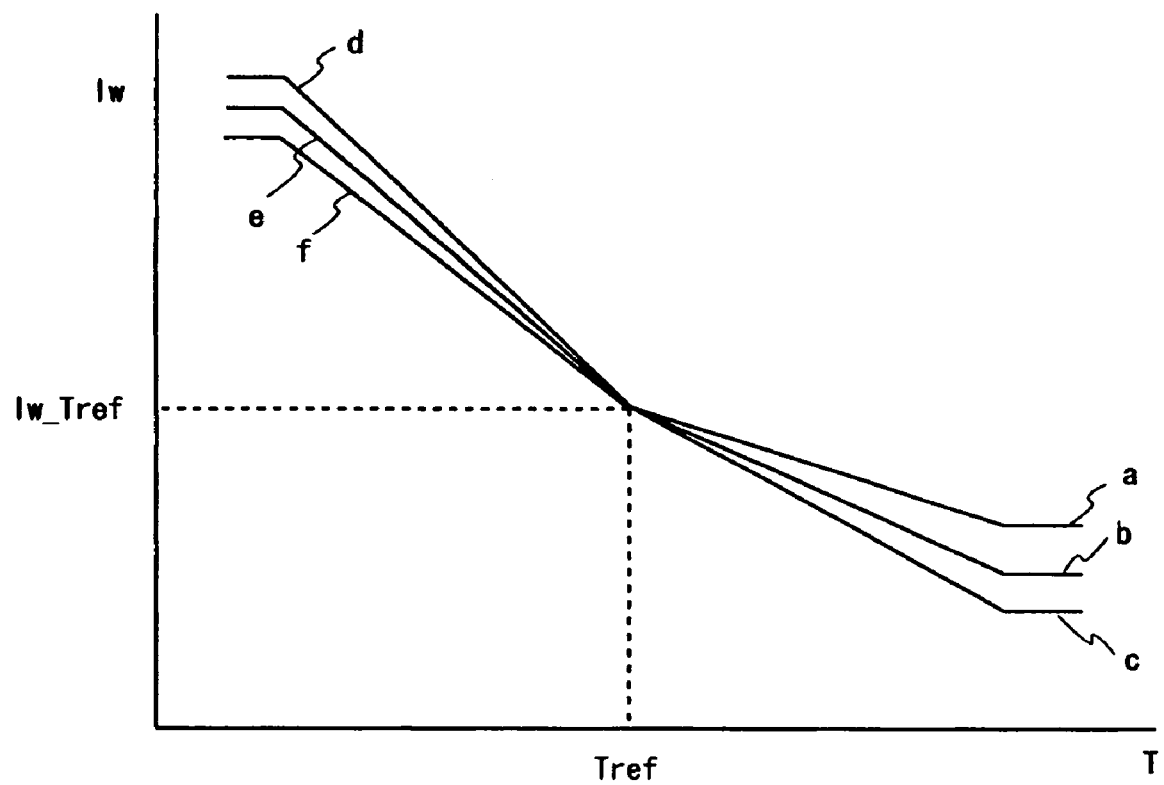
FIG. 7 shows a graph that specifies a write current relative to a measured temperature according to an embodiment of the invention.

The write current in the lower temperature range can also be determined by the same way as the above. Either the write currents in both the lower temperature range and the higher temperature range may be determined for each head device portion 12 according to the extent of the change in BER or the write currents in the higher temperature range may be set equal among the head device portions 12 and the write currents only in the lower temperature range may be set individually. FIG. 7 shows an example in which both of the inclination β in the higher temperature range and the inclination a in the low temperature range are determined from the relationship between the BER and the write current. Graphs a, b, and c in the higher temperature range are the same as those shown in FIG. 6.

The example of FIG. 7 shows three graphs d, e, and f in the lower temperature range. Preferably, the test computer 51 determines the inclination a of the write current function in the lower temperature range using a specified BER measured in a write current range higher than the reference write current Iw_Tref. For example, referring to FIGS. 8(a) and (b), the test computer 51 calculates the inclination of the approximate line from the four items of measurement data larger than the reference write current Iw_Tref by the method of least squares.

The test computer 51 determines the inclination α of the write current function in the lower temperature range according to the value of the inclination of the BER. The test computer 51 sets the inclination β that changes gradually to a head device portion 12 whose BER changes greatly relative to the write current; in contrast, it sets the inclination β that changes greatly to a head device portion 12 whose BER changes gradually.

Figure 8A:
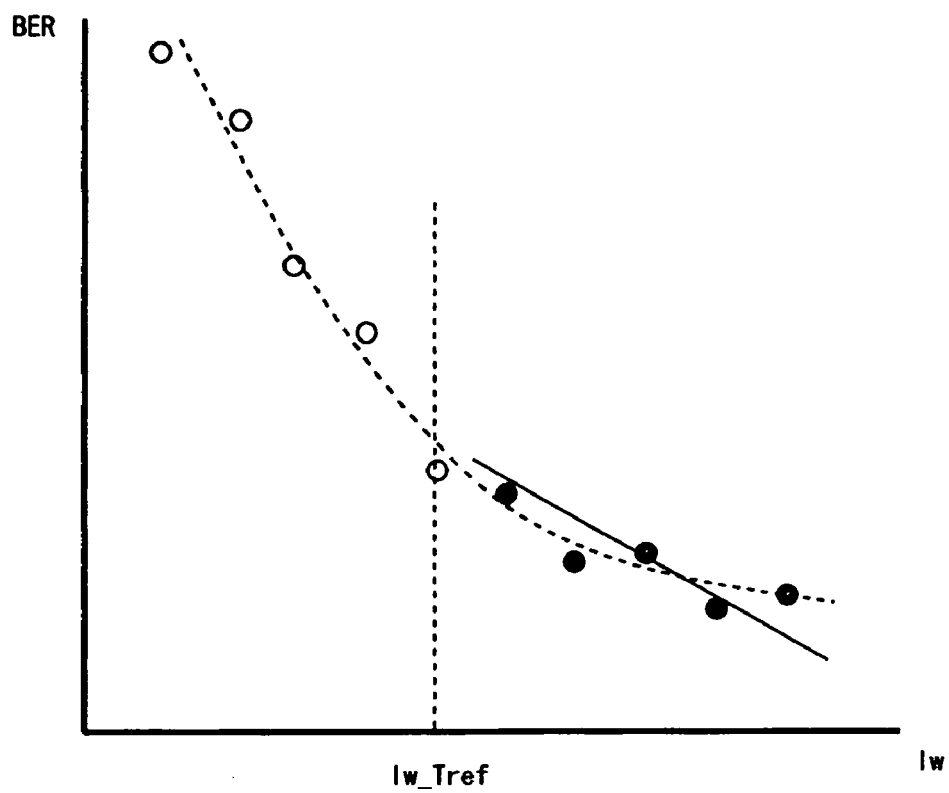
FIGS. 8(a) and 8(b) show examples of the relationship between write currents and measured error rates, according to an embodiment of the invention.
Figure 8B:
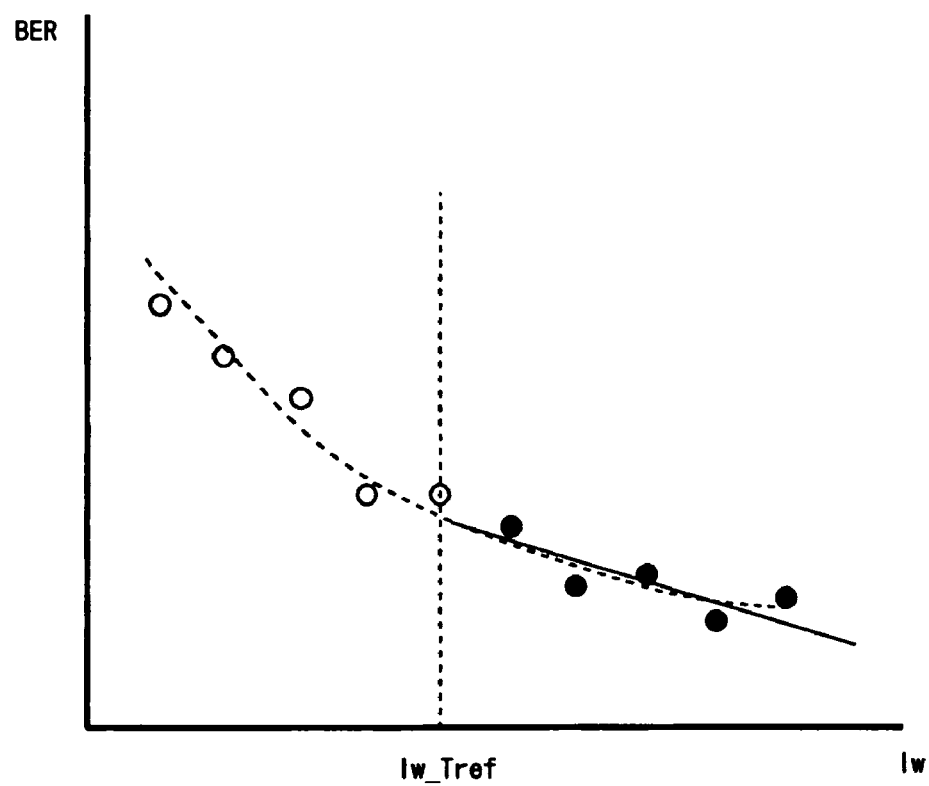

For example, as shown by the graph of the FIG. 8(a), a head device portion 12 whose BER changes greatly writes at a write current following the graph f with the smallest inclination in FIG. 7. As shown in FIG. 8(b), a head device portion 12 whose BER changes gradually writes at a write current following the graph d with the largest inclination in FIG. 7. Thus opposite characteristics such as an error rate or ATI can be balanced and an appropriate write current can be set to each head device portion 12.

Figure 9:
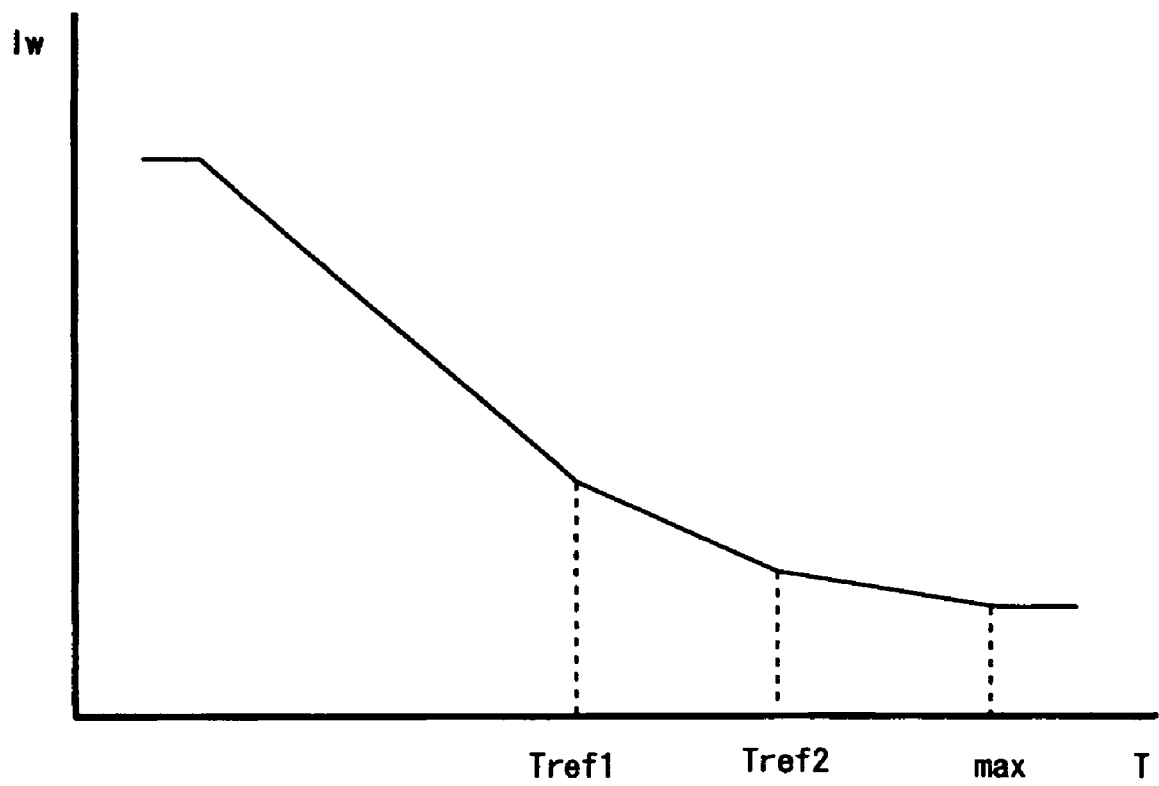
FIG. 9 shows a graph that specifies a write current relative to a measured temperature according to an embodiment of the invention.

The above examples show that one inclination is determined in the lower temperature range or the higher temperature range. According to another preferred embodiment, write current functions expressed by a plurality of lines are used in the lower temperature range and/or higher temperature range, and the inclinations of the lines are determined. Referring to FIG. 9, an example of determining two inclinations in the higher temperature range will be described. FIG. 9 shows the relationship between measured temperatures and write currents. A first reference temperature Tref1 corresponds to the reference temperature Tref in FIGS. 3 and 5.

The test computer 51 determines the inclination of the linear function from the first reference temperature Tref1 to a second reference temperature Tref2 and the inclination of the linear function in the temperature range lower than the second reference temperature Tref2 from the relationship between the measured BERs and the write currents. Write currents at temperatures higher than a specific temperature max are equal, as in the foregoing example. When the write current Iw_Tref1 at the first reference temperature Tref1 is a predetermined fixed value, the test computer 51 can determine the inclinations of two functions by determining the currents at the second reference temperature Tref2 and the specific temperature max. Typically, the extent of the change at temperatures lower than the second reference temperature Tref2 is smaller than that from the first reference temperature Tref1 to the second reference temperature Tref2.

The test computer 51 can determine two inclinations by a method similar to that described with reference to FIG. 5. For example, the test computer 51 determines the extent of the change of the measurements selected from the BER measurements at currents lower than the write current Iw_Tref1. The method for determination may be the same as that described with reference to FIG. 6. When the extent of the change in BER relative to the write current is large, the test computer 51 decreases the absolute values of the two inclinations. When the extent of the change in BER relative to the write current is small, the test computer 51 increases the absolute values of the two inclinations.

Alternatively, the test computer 51 divides the range lower than the write current Iw_Tref1 into two, thus determining the extent of the change in BER in each range. From the extent of the changes, the test computer 51 can determine both the extent of the change at temperatures from the first reference temperature Tref1 to the second reference temperature Tref2, and the extent of the change at temperatures lower than the second reference temperature Tref2.

Although the invention has been described according to the embodiments, it is to be understood that the invention is not limited to those. For example, the relationship between the processes and the logical structure is not limited to the foregoing embodiments. Designers can design a data storage device with efficient functions and circuit structure. In the above embodiments, the reference write currents Iw_Tref1 and Iw_Tref are fixed values equal for the head device portions 12. The values may be varied with the extent of the change in BER.

The extent of the change in BER is not limited to the approximate line of the points of measurement and may be specified by another method. For example, it is also possible to specify an approximate curve function of all points of measurement and to use the inclination of a tangent at a given point or the mean value of the inclinations of tangents at a plurality of points as the extent of the change in BER. It is also possible to determine the inclination of the function of the write current in the higher temperature range from the value of the BER of a specific write current and to determine the inclination of the function of the write current in the lower temperature range from the value of the BER of different specific write currents. The function to specify a write current may not be a linear function but also be a curved function. In this case, the extent of the change in BER can be set to an appropriate value by changing the coefficient of the function according to the extent of the change in BER. While the invention is useful particularly for HDDs, it may also be applied to other apparatuses that use a magnetic medium.

What is claimed is:

1. A method for determining a setting of a write current of a magnetic head, the write current varying with temperature, the method comprising:
    measuring, at a substantially fixed temperature, at least two values of a writing characteristic of the magnetic head for data being read from a magnetic disk where the data was written to the magnetic disk at a plurality of different write currents;
    calculating an extent of a change of the writing characteristic based on the at least two measured writing characteristic values relative to the write currents in a specified write current range; and
    determining the setting of the write current in a specified temperature range according to the extent of the change of the writing characteristic.

2. The method according to claim 1, wherein the writing characteristic is an error rate or a VGA gain.

3. The method according to claim 1, wherein determining the setting of the write current, comprises:
    determining an extent of a change in a function indicative of the write current in the specified temperature range according to the extent of the change in the writing characteristic, and
    determining the setting of the write current based on the function.

4. The method according to claim 1, wherein the specified write current range includes at least part of a write current range corresponding to the specified temperature range.

5. The method according to claim 1, wherein the extent of the change in the measured writing characteristic corresponds to an inclination of an approximate line calculated from the at least two values of the writing characteristic.

6. The method according to claim 5, further comprising storing the inclination of the approximate line into a management area of the magnetic disk.

7. The method according to claim 1, wherein determining the setting of the write current, comprises:
    determining a write current at a reference temperature, and
    determining an extent of a change in a function indicative of a write current at temperatures higher than the reference temperature according to the extent of the change in the writing characteristic.

8. The method according to claim 1, wherein the setting of the write current decreases with an increase in temperature;
    the extent of the change of the writing characteristic is specified in a range lower than the write current at a reference temperature;
    an extent of a change in a function indicative of a write current at temperatures higher than the reference temperature is determined according to the extent of the change of the writing characteristic at a range lower than the write current at a reference temperature; and
    the extent of the change in the function indicative of the write current is determined so as to decrease with an increase in the extent of the change of the writing characteristic at a range lower than the write current at a reference temperature.

9. An apparatus that determines a setting of a write current of a magnetic head, the write current varying with temperature, the apparatus comprising:
    a magnetic head that writes data on a magnetic disk at a plurality of different write currents at a substantially fixed temperature and reads the written data;
    a circuit that measures at least two values of a writing characteristic of the head based on the data read by the head, wherein each writing characteristic value corresponds to one of the plurality of different write currents; and
    a controller that determines the setting of the write current at a certain temperature within a specified temperature range according to an extent of a change of the measured writing characteristic calculated from at least two values relative to the write current in a specified write current range.

10. The apparatus according to claim 9, wherein the writing characteristic of the head is an error rate in the read data or a VGA gain in reading data.

11. The apparatus according to claim 9, wherein the controller determines an extent of a change in a function indicative of the write current in the specified temperature range according to the extent of the change in the measured writing characteristic.

12. The apparatus according to claim 9, wherein the specified write current range includes at least part of the write current range corresponding to the specified temperature range.

13. The apparatus according to claim 9, wherein the controller specifies an extent of a change of an approximate line calculated from at least two values of the writing characteristic in a range lower than a reference write current; and
determines an extent of a change of a linear function indicative of the setting of the write current in the higher temperature range corresponding to the reference write current according to the extent of the change of the approximate line so as to decrease with an increase in the extent of the change of the approximate line.

14. The apparatus according to claim 9, wherein the extent of the change of the measured writing characteristic corresponds to an inclination of an approximate line calculated from the at least two values of the measured writing characteristic.

15. The apparatus according to claim 14, wherein the controller stores the inclination of the approximate line of the measured writing characteristic into a management area of the magnetic disk.

16. A method for determining a setting of a write current of a magnetic head, the write current varying with temperature, the method comprising:
measuring, at a substantially fixed temperature, at least two values of a writing characteristic of the magnetic head for data being read from a magnetic disk where the data was written to the magnetic disk at a plurality of different write currents;
determining a write current at a reference temperature; and
determining an extent of a change of a function indicative of write currents at temperatures higher and/or lower than the reference temperature, the function based on at least two values of the measured writing characteristic in a specified write current range.

17. The method according to claim 16, wherein the function indicative of the write current is a linear function that decreases with an increase in temperature; and
the extent of the change of the function is determined according to an extent of a change of the measured writing characteristic based on the at least two values of the measured writing characteristic relative to the write current.

18. The method according to claim 16, wherein the extent of the change of the function indicative of write currents corresponds to an inclination of an approximate line calculated from the at least two values of the measured writing characteristic.

19. The method according to claim 18, further comprising storing the inclination of the approximate line into a management area of the magnetic disk.

20. An apparatus that determines a setting of a write current of a magnetic head, the write current varying with temperature, the apparatus comprising:
a magnetic disk storage device comprising:
a management area, wherein the management area stores a pre-determined function for setting the write current at a measured temperature, the function generated by:
measuring, at a substantially fixed temperature, at least two values of a writing characteristic of the magnetic head for data being read from a magnetic disk where the data was written to the magnetic disk at a plurality of different write currents;
calculating an extent of a change of the writing characteristic based on the at least two measured writing characteristic values relative to the write currents in a specified write current range; and
determining an extent of a change of the function based on the extent of the change of the writing characteristic.

* * * * *

UNITED STATES PATENT AND TRADEMARK OFFICE
CERTIFICATE OF CORRECTION

PATENT NO. : 7,982,991 B2  
APPLICATION NO. : 11/807044  
DATED : July 19, 2011  
INVENTOR(S) : Junzoh Noda et al.

Page 1 of 1

It is certified that error appears in the above-identified patent and that said Letters Patent is hereby corrected as shown below:

In Detailed Description of the Invention:

Column 4, Line 6, please delete "a." and insert -- a -- therefor;
Column 6, Line 33, please delete "a" and insert -- α -- therefor;
Column 8, Line 49, please delete "a" and insert -- α -- therefor;
Column 10, Line 14, please delete "a" and insert -- α -- therefor;
Column 10, Line 18, please delete "andf" and insert -- and f -- therefor;
Column 10, Line 38, please delete "graphf" and insert -- graph f -- therefor.

Signed and Sealed this  
Thirteenth Day of March, 2012

David J. Kappos  
*Director of the United States Patent and Trademark Office*